United States Patent [19]

Lacy et al.

[11] Patent Number: 5,320,388

[45] Date of Patent: Jun. 14, 1994

[54] WELL TUBING LINER SYSTEM

[75] Inventors: Philip B. Lacy, Houston; Norman Neitzel; Lynn Ebersole, both of Odessa, all of Tex.

[73] Assignee: Miller Pipeline Service Corporation, Houston, Tex.

[21] Appl. No.: 892,605

[22] Filed: May 29, 1992

Related U.S. Application Data

[63] Continuation of Ser. No. 643,287, Jan. 22, 1991, abandoned, which is a continuation of Ser. No. 160,271, Feb. 25, 1988, abandoned.

[51] Int. Cl.$^5$ ............................................ F16L 55/128
[52] U.S. Cl. ....................................... 285/55; 285/353; 285/355; 285/390
[58] Field of Search ................... 285/85, 333, 334, 355, 285/390, 369, 353; 29/523, 509, 516, 512

[56] References Cited

U.S. PATENT DOCUMENTS

| | | | |
|---|---|---|---|
| 122,131 | 12/1871 | Platt | 285/55 X |
| 2,077,035 | 4/1937 | Bredeson | 285/353 |
| 2,664,373 | 12/1953 | Reilly | 154/82 |
| 2,724,672 | 11/1955 | Rubin | 154/82 |
| 2,761,702 | 9/1956 | Noel | 285/355 X |
| 2,805,872 | 9/1957 | Routh | 285/55 |
| 3,020,068 | 2/1962 | Costanzo | 285/55 |
| 3,030,253 | 4/1962 | St. John et al. | 156/196 |
| 3,050,786 | 8/1962 | St. John et al. | 18/59 |
| 3,192,612 | 7/1965 | Elliott et al. | 29/157 |
| 3,266,821 | 8/1966 | Safford | 285/40 |
| 3,284,108 | 11/1966 | West | 285/55 |
| 3,298,716 | 1/1967 | Taylor et al. | 285/55 |
| 3,372,462 | 3/1968 | Reid et al. | 29/447 |
| 3,382,121 | 5/1968 | Sherlock | 156/165 |
| 3,427,050 | 2/1969 | Krieg | 285/55 |
| 3,459,619 | 8/1969 | Maxwell | 156/293 |
| 3,461,918 | 8/1969 | Gerner | 138/148 |
| 3,479,059 | 11/1969 | Taylor et al. | 285/55 |
| 3,593,391 | 7/1971 | Routh | 25/38 |
| 3,596,931 | 8/1971 | Mishler | 285/55 |
| 3,606,659 | 9/1971 | Robbins | 29/157 |
| 3,620,555 | 11/1971 | Hinds | 285/55 |
| 3,687,487 | 8/1972 | Lindholm | 285/55 |
| 3,939,243 | 2/1976 | Dawson | 264/296 |
| 3,968,552 | 7/1976 | Hunter | 29/157 |
| 4,025,751 | 5/1977 | Wright | 219/216 |
| 4,296,954 | 10/1981 | Fujimaki et al. | 285/331 |
| 4,377,894 | 3/1983 | Yoshida | 29/421 R |
| 4,496,499 | 1/1985 | Brittain | 264/36 |
| 4,507,842 | 4/1985 | Werner | 285/55 X |
| 4,556,240 | 12/1985 | Yoshida | 285/55 |
| 4,568,113 | 2/1986 | Axford et al. | 285/334 |
| 4,588,215 | 5/1986 | Moxham | 285/382.2 |
| 4,709,946 | 12/1987 | Hunter | 285/355 X |
| 4,773,479 | 9/1988 | Guy | 285/55 X |
| 4,852,655 | 8/1989 | Guy | 285/55 X |
| 4,856,828 | 8/1989 | Kessler et al. | 285/55 X |
| 4,883,292 | 11/1989 | Kuroki | 285/55 |
| 4,923,663 | 5/1990 | McMillan . | |
| 4,997,613 | 3/1991 | McMillan . | |
| 5,028,081 | 7/1991 | Fournier | 285/353 X |

FOREIGN PATENT DOCUMENTS

| 1241262 | 9/1987 | Canada . | |
| 1022860 | 1/1958 | Fed. Rep. of Germany | 285/55 |
| 0091022 | 5/1984 | Japan . | |
| 2084686A | 9/1980 | United Kingdom . | |
| 2176865A | 6/1985 | United Kingdom . | |

Primary Examiner—Randolph A. Reese
Assistant Examiner—Heather Chun
Attorney, Agent, or Firm—Barnes & Thornburg

[57] ABSTRACT

A well tube liner system includes rigid, self supporting plastic liners inserted within well tube sections and including end flanges adjacent opposed ends of the tube sections for sealing against each other and against a connecting collar when the tube sections are drawn axially together during assembly of the tube sections. An auxiliary spacer corresponding in general configuration to the flanges is provided for insertion between the flanges of liner sections to maintain the flanges in axially spaced apart and sealed condition to compensate for worn threads while retaining the same liner sections.

10 Claims, 3 Drawing Sheets

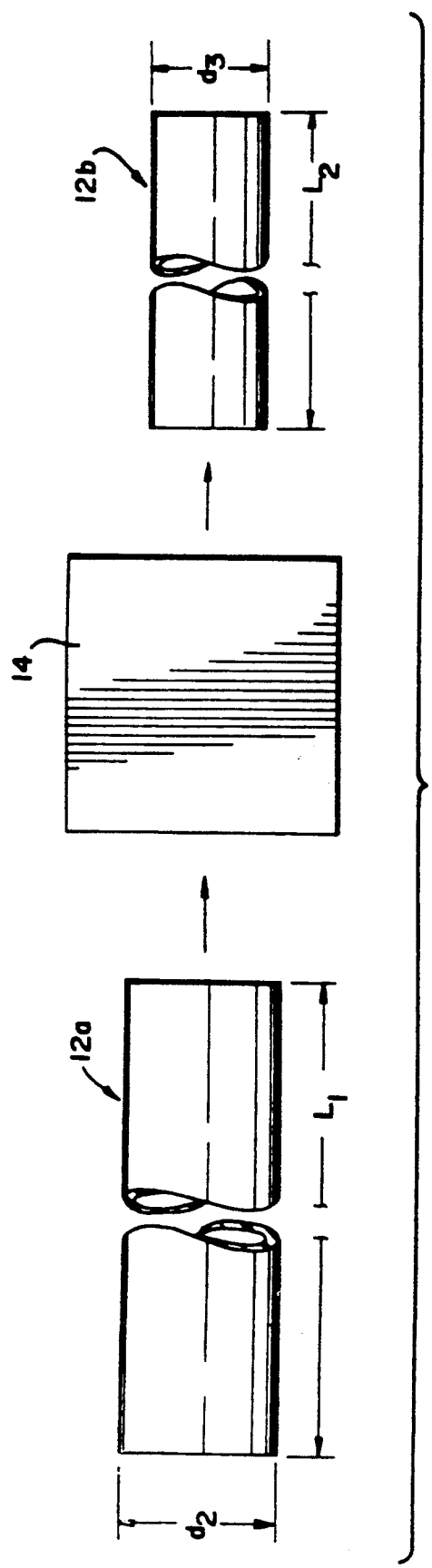
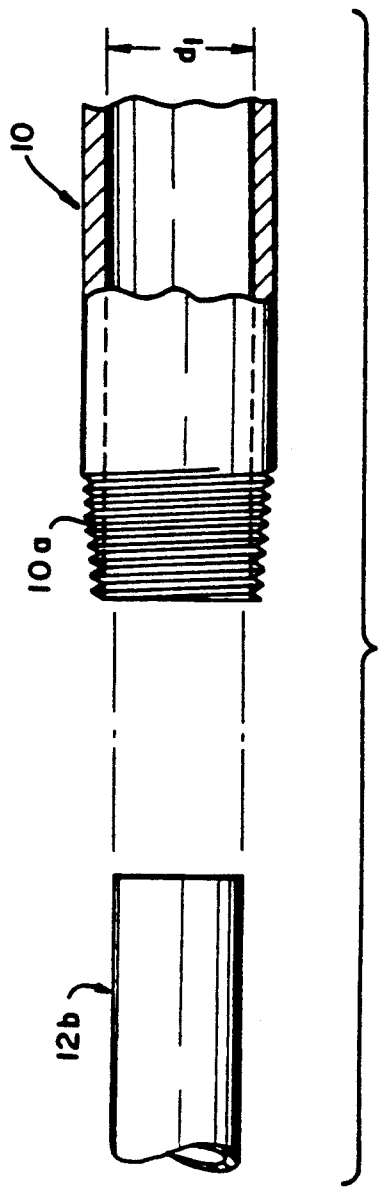
FIG 1
FIG 2

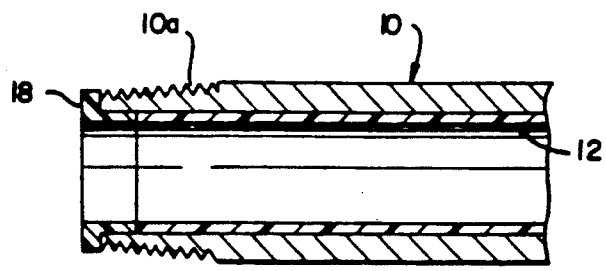
FIG 9
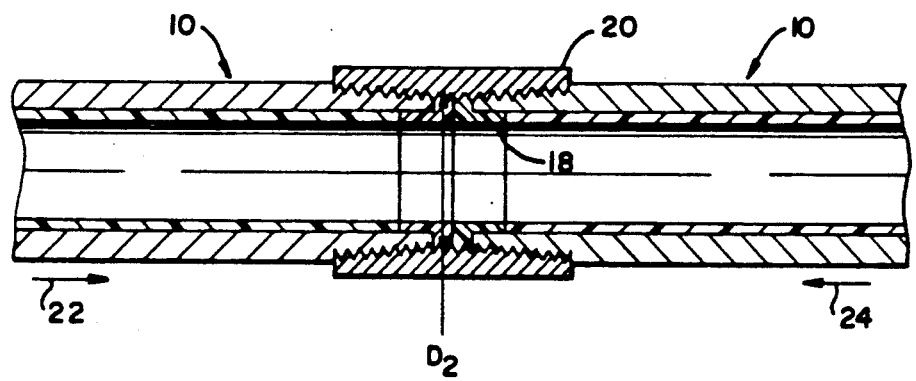
FIG 10
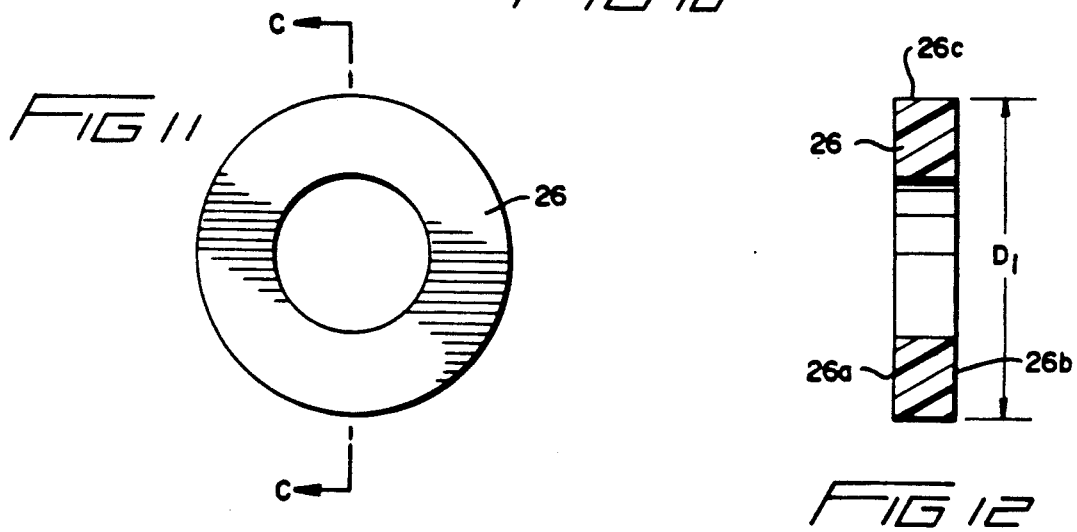
FIG 11
FIG 12
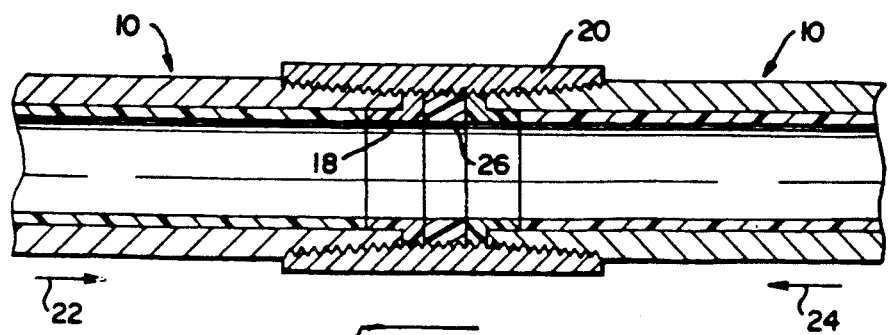
FIG 13

WELL TUBING LINER SYSTEM

This application is a continuation of application Ser. No. 643,287, filed Jan. 22, 1991 which is a continuation of Ser. No. 160,271, filed Feb. 25, 1988, both abandoned.

BACKGROUND OF THE INVENTION

This invention relates to a system for applying a plastic liner to oil field country tubulars, such as well tubing, and a joint formed by such tubing incorporating the plastic liner. More particularly, flanges attached to the liner have both radial and circumferential sealing surfaces to positively prevent fluid in the well tubing from contacting either the interior of the tube or a connecting collar.

Well tubing has have been utilized for many years to provide a flow path for fluids passing to and from the well reservoir. The well tubes are inserted into a well that has been drilled and are used to inject fluids into the well reservoir to raise pressure and fluid levels, and to remove oil or gas from the completed well. The fluids cause abrasion and deterioration of the tubes and the collars connecting them. Therefore, it is well known to provide tubes with a liner in order to minimize the abrasion and the deterioration of the tube. The liner may take the form of a layer of cement or a plastic coating applied to the interior surface of the tube. The interior of the tube may also be coated or covered with other materials which are relatively inert to the fluids passing through the well tube.

A series of tubes are typically attached together end to end by collars which threadingly engage adjacent ends of the tubes. The ends of the tubes and the collar have corresponding threads, usually tapered, such that rotation of the collar and tubes relative to each other draws the ends of the well tubes toward each other in secured relationship. In order to prevent deteriation of the collar and leakage at the joint area, it has been proposed to provide end seals on the ends of the tubes by either a separate flange piece attached to the tube liner or by rolling over the tube liner to cover the end of the tube. However, these systems have not completely alleviated the problems, since the junction between adjacent flanges or between the rolled over liners often does not provide an adequate seal. Furthermore, rolling or otherwise forming the liner over the end of the tube requires threads to be formed thereon to match those of the collar. As a practical matter, this is difficult, if not impossible, to accomplish and still maintain reasonable production costs. The wear of the threaded lining occasioned by the installation and removal of the collars eventually causes the lining seal to deteriorate thereby necessitating a complete re-fitting of the liner.

It is also known to provide rigid liners for underground pipelines by forming the liner from a plastic material with an initial outer diameter greater than the interior diameter of the pipeline. The liner diameter is reduced prior to inserting it into the pipeline. After insertion, the liner is expanded into contact with the pipeline by drawing a heating element through its interior, by physical expansion using an interior plug, by application of internal pressure or simply letting the liner expand towards its initial diameter by relaxation.

It is also known to form a rigid plastic liner with an outer diameter less than the inner diameter of a section of pipe. Subsequent to insertion of the liner, flanges are attached to each end of the liner and a heated fluid is passed through the liner to cause it to expand and contact the interior of the pipe section. The axially facing end of the flange is brought into sealing engagement with a corresponding sealing surface of an adjacent flange when the pipeline sections are bolted together.

SUMMARY OF THE INVENTION

The present invention relates to a well tubing liner system and a joint which obviates the drawbacks and difficulties of the known systems. The system according to the present invention includes a rigid plastic liner which may be initially formed so as to have an outside diameter greater than the inside diameter of the tube. The liner preferably is passed through a reducing device, which may be a reducing roll, a die, or the like, so as to elastically deform the liner and reduce the outside diameter to a dimension less than the inside diameter of the tube. The reduced diameter liner, preferably having plain ends, is then inserted into the tube section. Flanges, formed of the same plastic material as the liner, are attached by fusion to each end of the liner. The ends of the liner may be expanded to match the size of the flanges before they are attached. The liner is then allowed to return toward its original diameter, preferably without the application of heat or internal pressure thereto. The elastic memory of the liner material causes it to radially expand until the outer surface of the liner contacts the inner surface of the tube. The radial expansion also causes the liner to longitudinally contract so as to place each of the flanges into abutting, sealing relationship with the ends of the tube. Since the flange is integrally attached to the liner, there is no juncture between these elements to leak and allow the internal fluids to come into contact with the tube. Each of the flanges applied to the plastic liner defines an axially facing, radial sealing surface, as well as a circumferential sealing surface extending around the outer periphery of the flange.

The ends of the tubes define externally threaded portions ("pins") which are engaged by an attaching collar. The threads on the tube ends, as well as those formed on the interior of the collar usually are tapered in known fashion. The collar has a minimum internal diameter portion located generally at its longitudinal center. The minimum internal diameter of the collar is approximately equal to the diameter of the circumferential sealing surfaces of the flanges.

The tube ends are attached together by placing them in opposed ends of the collar and rotating the collar and tubes relative to each other so as to exert an axial force on the tubes, urging the ends together. The axial force brings the radial sealing surfaces of the adjacent flanges into sealing contact with each other. The collar also causes the flanges to plastically deform in a radially outward direction so as to bring the circumferential sealing surfaces into contact with the interior threads of the collar. When the interior of the liner is normally pressurized by heated fluid passing therethrough, the circumferential sealing surfaces are brought even more intimately into sealing engagement with the collar. Thus, the joint formed provides both radial and circumferential sealing surfaces so as to prevent any contact of the fluid with either the interior tube or the interior of the collar.

The continued assembly and breakdown of the tube joints, which is typical in their normal usage, eventually will cause wear on the flanges, and the threads of the collar and tubes. The continued use causes changes in the standoff, lead and taper of the threads on the tubes and collars which eventually necessitate the use of a new collar. In this instance, the invention allows continued usage of tubes having worn threads by providing an annular spacer, formed of the same plastic material as the flanges and the liner, placed between the radial sealing faces of adjacent flanges. The spacer also defines radial sealing surfaces and a circumferential sealing surface having a diameter equal to those of the flanges and substantially equal to that of the minimum inside diameter of the collar. Tightening the collar joint after the spacer has been inserted between the inner flanges brings the radial sealing faces of the spacer into sealing contact with the radial sealing faces of the adjacent flanges and also causes the spacer to plastically deform radially outwardly to contact the interior of the collar. Again, the internal pressure and temperature of the fluid carried by the tube will force the circumferential sealing surface of the spacer into sealing engagement with the collar to prevent any possibility of contact between the collar and the fluid within the tube.

BRIEF DESCRIPTION OF THE DRAWINGS

FIG. 1 is schematic representation of the method and apparatus for reducing the outside diameter of the tube liner according to the invention.

FIG. 2 is a partial, exploded view, partially broken away, showing the insertion of the reduced diameter tube liner into the tube.

FIG. 9 is a partial sectional view of the invention showing the liner in its final expanded condition.

FIG. 10 is a partial, cross-sectional view of a joint formed of two tubes incorporating the liner system according to the invention.

FIG. 11 is a front view of a spacer utilized in an alternative embodiment of the invention.

FIG. 12 is a cross-sectional view taken along line C—C of FIG. 11.

FIG. 13 is a partial, cross-sectional view showing a joint formed by the invention utilizing the spacer of FIG. 11.

DESCRIPTION OF THE PREFERRED EMBODIMENTS

Figure 3:
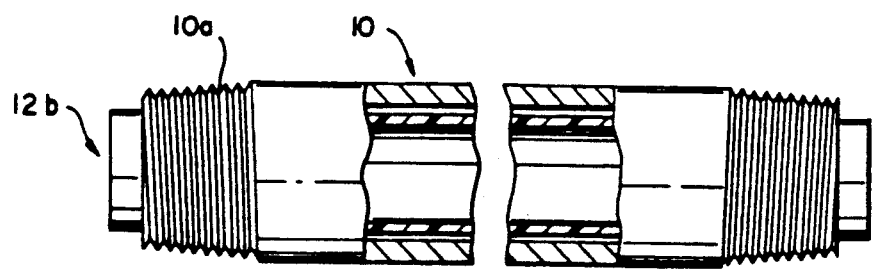
FIG. 3 is a side view, partially broken away, showing the tube liner installed in the tube.

The present invention provides a system for applying a rigid, self supporting plastic liner to the interior of a well tubing such that the liner is in contact with the interior surface of the tube and flanges attached to either end of the liner are in abutting, sealing contact with the ends of the tube. The tube 10, as illustrated in FIG. 2, has an internal diameter of $d_1$ and has externally threaded "pin" end portions. One such threaded end portion 10a is illustrated in FIG. 2, however, it is to be understood that the opposite end may be similarly configured. The threads are shown as being a known tapered thread; however, other types of threads may be utilized within the scope of this invention.

Prior to the installation in the tube 10, the liner, illustrated generally at 12a in FIG. 1, may have an outside diameter slightly less than the inside diameter of tube 10 or may have an outside diameter of $d_2$ such that $d_2$ is greater than the inside diameter $d_1$ of the tube 10. In the latter instance, the initial liner 12a is passed through a means 14 for reducing the outer diameter of the liner to a dimension $d_3$, as illustrated at 12b, while maintaining substantially the same cross-sectional configuration. The means 14 may include known devices such as a plurality of reduction rollers, an extrusion-type die, or any other means which will reduce the outside diameter of the liner while maintaining substantially the same cross-sectional configuration. The apparatus for reducing the outside diameter of the liner, per se, forms no part of the instant invention and any such known apparatus may be utilized.

The diameter $d_3$ of the liner 12b is such that it is less than $d_1$ of the tube 10. However, the material utilized for the liner should be such that the diameter reduction from $d_2$ to $d_3$ does not exceed the elastic memory of the material. An ultrahigh molecular weight, high density polyethylene (UHMWHDPE) manufactured by Philips Driscopipe, Inc. under the trademark Driscopipe 9100, has been found to yield satisfactory results. Quite obviously, other materials may be utilized within the scope of this invention, as long as the material exhibits a sufficient elastic memory to expand radially toward its initial diameter and is sufficiently inert to the fluid to be utilized within the lined tube. Typical physical properties of Driscopipe 9100 are illustrated in Table 1. Other materials exhibiting similar properties may be utilized without exceeding the scope of this invention.

TABLE I

| Property | Test Method | Value |
|---|---|---|
| Density | ASTM D-1505 | 0.957 gm/cc |
| Melt Flow | ASTM D-1238 (Cond. F) | 1.5 gms/10 min. |
| Environmental Stress Cracking Resistance | ASTM D-1693 (Cond. D) | >5000 hrs |
| Tensile Strength Yield | ASTM D-638 (2"/min) | 3500 psi |
| Elongation at Break | ASTM D-638 (2"/min) | >600% |
| Impact Strength | | |
| .25" thickness | ASTM D-256 | 7 ft. lbs/in. notch |
| .125 thickness | | 12 ft. lbs/in notch |
| Vicat Softening Temperature | ASTM D-1525 | 257° F. |
| Brittleness Temperature | ASTM D-746 | <−180° F. |
| Flexural Modulus | ASTM D-3350 | 125,000 psi |
| Modulus of Elasticity | ASTM D-638 | 110,000 psi |
| Hardness | ASTM D-2240 | 64 (Shore D) |
| Coefficient of Linear Thermal Expansion | | |
| Molded Specimen | ASTM D-696 | .788 × 10$^{-4}$ in/in/°F. |
| Extruded Liner | | 1.2 × 10$^{-4}$ in/in/°F. |
| Thermal Conductivity | Dynatech-Colora Thermoconductor | 2.7 BTU, in/ft$^2$/hrs/°F. |

The initial pipe liner 12a is illustrated in FIG. 1 as having a finite length $L_1$. The length $L_2$ of the reduced diameter liner 12b will, of course, be greater than the initial length $L_1$ after the liner has passed through diameter reduction means 14. It is envisioned that the initial liner 12a may also be produced in indefinite lengths, passed through the diameter reducing apparatus 14 and subsequently cut into desired lengths. The length $L_2$ of the reduced diameter liner 12b should be greater than the length of the individual tube such that, after placing the liner 12b in the tube 10, a portion of the liner will extend beyond the ends of the tube as illustrated in FIG. 3.

The diameter $d_3$ is sufficiently smaller than diameter $d_1$ to permit the easy installation of the liner 12b by either attaching a device to one and pulling it through the tube, or attaching a device to the opposite end and pushing the liner through the tube. Such devices for inserting liners in pipes and tubes in general are well known and any such known device may be utilized to place the liner 12b in the tube 10. At this point, the liner is in its elastically deformed state such that the outer diameter of the liner 12b just clears the wall of the tube 10 as illustrated in FIG. 3.

While the liner 12b is still in its elastically deformed state, flanges may be attached to both ends of the liner. The flanges may take the form of an annular structure, illustrated in FIGS. 4 and 5 or, the flange structure having an axially extending body portion as illustrated in FIGS. 6 and 7. In either case, the flanges are formed from the same plastic material as the liner 12b. The flange 16, illustrated in FIGS. 4 and 5, comprises a substantially annular structure having an unthreaded outer diameter $D_1$ and an inner diameter of sufficient magnitude so as to slide over the end of the liner 12b. Flange 16 defines an axially facing, radially extending sealing surface 16a and a circumferential sealing surface 16b having a diameter $D_1$. The flange may be fixedly attached by fusion to the end of liner 12b by any known method, such as heat bonding, welding, etc. so that it is integral with the liner. While the liner 12b is in its elastically deformed state, the flange is spaced away from the end of the tube 10, as illustrated in FIG. 8.

Preferably the flange 18, illustrated in FIGS. 6 and 7 is utilized with the liner 12b. The flange 18 also defines an axially facing, generally radially extending sealing surface 18a as well as an axially extending body portion 18b having an axial end 18c which is fused to the axial end of the liner 12b as seen in FIG. 9. Circumferential sealing surface 18d is formed on flange 18 so as to have a diameter of $D_1$ which, as shown in FIGS. 8 and 9, corresponds to the diameter of the ends of the respective tubes 10 which receive the axially extending body portions 18b as measured across the tube end thread crests. The flange 18, for example, could be machined from the same material as the liner, such as a thicker wall section of tube liner material.

In an alternative embodiment, the liner 12b may be elastically stretched in a longitudinal direction after placing it within the tube 10. This may be accomplished by attaching a flange to one end of the liner and gripping the opposite end with a device so as to exert a longitudinal force thereon. Continued application of the longitudinal force at the opposite end will, after bringing the flange into contact with the adjacent one end of the tube, cause the elastic, longitudinal stretching of the liner. The liner then may be clamped in its stretched position while a flange is applied to the opposite end. Once the flange has been attached, the clamping device may be removed. The liner then will be made or allowed to contract longitudinally due to its elastic memory and the subsequent radial expansion as it tends toward returning to its initial diameter $d_2$.

Whether or not the liner is stretched before the application of the flanges to both or either of its ends, its elastic memory will cause the material to radially expand as it tends to return to its original diameter $d_2$. Although the material may expand radially due solely to its elastic memory, it is envisioned that heat or internal pressure, or a combination thereof, may be applied to the liner to assist in its radial expansion. Since $d_2$ is greater than the interior diameter $d_1$ of the tube, quite obviously the liner cannot return to its full original dimension. However, its radially outward expansion usually will bring the liner into firm contact with the interior surface of the tube 10 as illustrated in FIG. 9 without the need to extend the liner with fluids or mechanically. Also, the radial expansion of the liner 12 will also cause its longitudinal contraction, thereby bringing the flanges 16 or 18 into abutting, sealing relationship with the ends of the tube. The tube formed by the invention provides a liner firmly attached to its interior while at the same time providing the tube ends with radial and circumferential sealing surfaces formed by the flanges. The rigidity of the liner will prevent its radially inward collapse even in the absence of internal pressure or in the presence of sub-atmospheric pressure in the tube.

Figure 4:
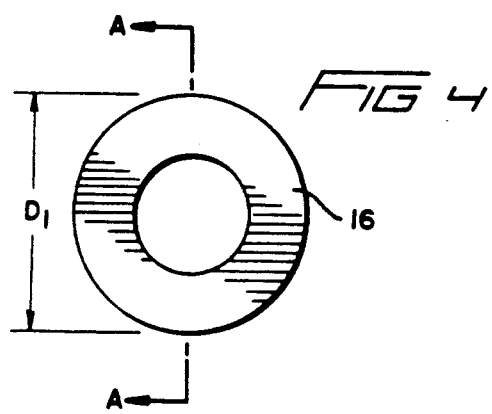
FIG. 4 is a front view of one embodiment of a flange to be attached to the tube liner.
Figure 5:
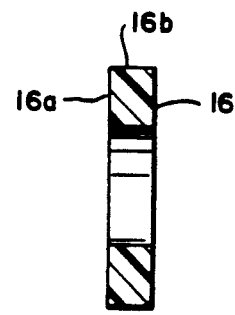
FIG. 5 is a cross-sectional view taken along line A—A of FIG. 4.
Figure 6:
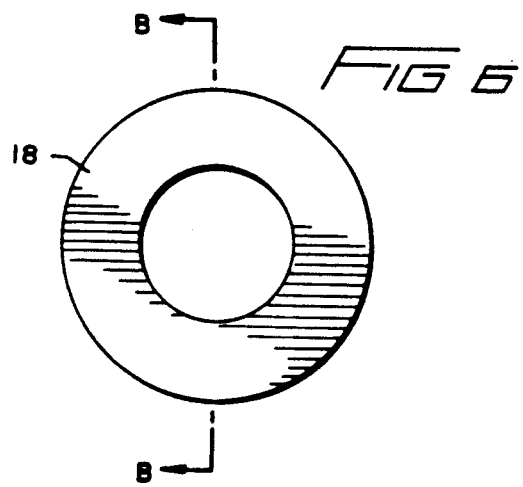
FIG. 6 is a front view of the preferred embodiment of a flange to be attached to the tube liner.
Figure 7:
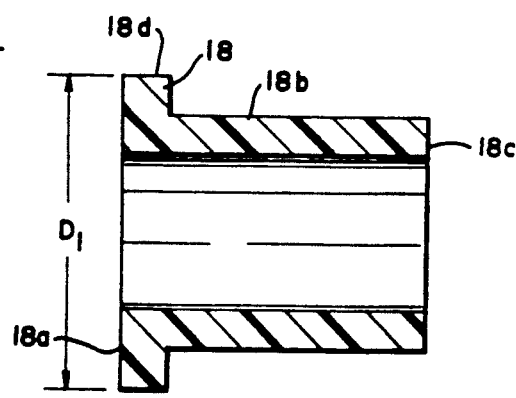
FIG. 7 is a cross-sectional view taken along line B—B in FIG. 6.
Figure 8:
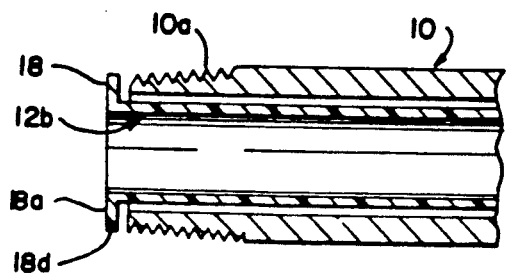
FIG. 8 is a partial, cross-sectional view showing the liner in the tube with the flange installed.

It will be appreciated that either type of flange, i.e., according to FIG. 4, 5 or FIG. 6, 7 will be attached to the end of the tube liner in such a manner that, upon expansion of the tube liner to fit within the internal diameter of the tube, virtually no gap will exist between the outside of the tube liner and the inside of the tube and the inside of the tube at the end of the liner adjacent the tube end. To accomplish this, for example, if the flange according to FIG. 4, 5 is utilized, the internal diameter of the flange would be sized to correspond with the external diameter of the expanded tube and the ends of the liner would be expanded somewhat by a mandrel or the like before fusion bonding the annular flange member on the end of the liner. Thus, upon full expansion of the liner, the outer diameter of the liner, including the liner adjacent the flange, would correspond with the inner diameter of the tube 10.

Likewise, if the flange according to FIG. 6, 7 is utilized, the outer diameter of the axially projecting portion 18b would be sized to correspond with the inner diameter of the tube, and the inner diameter of the axial portion 18b would be sized to correspond with the expanded inner diameter of the liner. The ends of the liner would be expanded slightly by a mandrel or the like before the end 18c is fused on a mating end of the liner.

Alternatively, the projecting portion 18b may have a wall thickness greater than that of the liner such that, after attachment, the flange may be machined in situ to match the liner configuration.

As is well known in the art, well tubes are fastened together by means of an attaching collar 20 which threadingly engages the threads 10a of adjacent pins of tube 10. Typically, the threads 10a on the tubes 10 are tapered to correspond with tapered threads on the collar 20 and which extend longitudinally inwardly from each end. This gives the collar a central portion having a minimum diameter $D_2$ (FIG. 10) as measured across the collar thread groove. This minimum diameter portion is located approximately at the mid-point of the collar, longitudinally aligned with the juncture between the adjacent tubes. The diameter $D_1$ of the circumferential sealing surfaces 16b or 18d is dimensioned to correspond substantially with diameter $D_2$ of the collar.

Relative rotation between collar 20 and tubes 10 exerts axial forces on the tubes and causes them to move in the direction of arrows 22 and 24, respectively, until the radial sealing surfaces 16a or 18a come into contact with each other. Continued rotation of collar and/or tubes forces the radial sealing surfaces 16a or 18a into sealing engagement with each other and also causes the flanges 16 or 18 to undergo plastic cold flow deformation, thereby expanding them radially outwardly and forcing circumferential sealing surfaces 16b or 18d into contact with the interior surface of collar 20. The axial forces exerted on the tubes by the collar provides a pre-set force to bring the circumferential sealing surfaces into contact with the interior of the collar. The normally occuring high pressure and elevated temperature conditions which exist within the tube provide a natural expansion force which further urges the flanges radially outwardly against the inner surface of collar 20 so as to effect a sealing engagement between the circumferential sealing surfaces 16b or 18d and the interior surface of the collar. Thus, the structure according to the invention provides a joint having not only a radial sealing interface, but a circumferentially extending sealing interface as well, thereby ensuring that the fluid within the tube does not contact either the end of the tubes or the interior surface of the collar. It is to be noted that the flanges 16 or 18 are also pressed forcefully against the axial ends of the tubes to provide sealing in this area.

Repeated breakdown and makeup of the tube sections normally causes wear on the threads of collars 20 and those on the ends of tubes 10 making it more difficult to draw the tubes together and provide an adequate seal. Such thread wear will eventually necessitate the use of a new collar. Previously, even the use of a new collar often was not adequate to form an adequate seal between tubes with worn threads. The present invention obviates this problem by providing a spacer 26 formed of the same material as the liner 12 and the flanges 16 or 18 between adjacent flanges. As illustrated in FIGS. 11 and 12, the spacer 26 has a generally annular configuration with an outside diameter $D_1$ approximately equal to that of the flanges. The spacer 26 defines axially facing, generally radially extending sealing surfaces 26a and 26b on opposite sides, as well as circumferential sealing surface 26c.

When wear of the threads of collar 20 has reached the point wherein an adequate seal cannot be maintained between radial sealing surfaces of the flanges, a new collar is used and spacer 26 is inserted between the radial sealing surfaces 16a or 18a of adjacent flanges 16 or 18 as illustrated in FIG. 13. Collar 20 is installed and rotated relative to tubes 10 in the normal fashion, thereby generating axial forces on adjacent tubes 10 in the direction of arrows 22 and 24. This axial force brings radial sealing surfaces 16a or 18a into sealing contact with corresponding radial sealing surfaces 26a and 26b formed on the spacer 26. As in the previously described embodiment, continued rotation of tubes relative to collar 20 applies a pre-set force to the spacer 26 as well as the flanges, causing them to undergo plastic cold flow deformation in a radially outward direction to bring the circumferential sealing surfaces 26c and 16b or 18d into contact with the interior surface of collar 20. The high pressure and high temperature conditions within the tube will serve to further force the spacer radially outwardly so as to bring the circumferential sealing surface 26c into sealing engagement with the interior of collar 20. Since all of the elements of the liner joint (the liner, the flanges and the spacer) are all formed of the same material, the possibility of relative expansion and contraction which would expose a gap in the sealing surfaces or the junctions of the elements is avoided and compatibility of materials is assured.

The foregoing description is provided for illustrative purposes only and should not be construed as in any way limiting this invention, the scope of which is defined solely by the appended claims.

What is claimed is:

1. A well tube joint comprising:
   a first well tube having a first end with an externally threaded tapered portion adjacent the first end, said threaded portion having a minimum external diameter at the first tube first end as measured across the thread crests;
   a first rigid, self-supporting plastic liner for insertion into the first well tube to extend through the first well tube;
   a first flange formed of the same plastic material as the first plastic liner attached to the first plastic liner and abutting the first end of the first well tube, the first flange defining a first radial sealing surface and a first unthreaded circumferential sealing surface having an external diameter corresponding to said minimum external diameter of the threaded portion of the first tube first end;
   a second well tube having a second tube second end with an externally threaded tapered portion adjacent the second end, said threaded portion having a minimum external diameter at the tube second end as measured across the thread crests;
   a second rigid, self-supporting plastic liner for insertion into the second well tube to extend through the second well tube;
   a second flange formed of the same plastic material as the second plastic liner attached to the second plastic liner and abutting the second end of the second well tube, the second flange defining a second radial sealing surface and a second unthreaded circumferential sealing surface having an external diameter corresponding to said minimum external diameter of the threaded portion of the second tube second end;
   the first and second rigid self-supporting plastic liners and said first and second flanges each having the same internal diameter throughout their lengths;
   a collar having internal threads engaging the threaded portions of the first and second well tubes, said collar internal threads comprising inwardly tapered threads having a minimum internal diameter as measured across the thread crest inside the collar in the central area of the collar;
   said first and second tube ends, collar and flanges being dimensioned such that upon making up the well tube joint by threading the collar to the first and second tube ends, said flanges sealingly abut each other at their radial sealing surfaces and said circumferential sealing surfaces sealingly engage the internal threads of the collar with said collar threads penetrating the outer circumference of the flanges; and
   wherein there is provided a smooth constant internal diameter flow path throughout the tubes due to the liners and flanges constant internal diameter.

2. The tube joint according to claim 1, including a plastic annular spacer formed from the same plastic material as the first and second flanges, said annular spacer defining third and fourth radial sealing surfaces at its opposed ends and a third circumferential sealing surface about its circumference, said circumferential sealing surface having an external diameter corresponding to the diameters of the first and second flanges, said spacer located between the first and second flanges; said spacer being dimensioned such that the first and third radial sealing surfaces are in sealing contact, and the second and fourth sealing surfaces are in sealing contact, and the third circumferential sealing surface sealingly engages the interior threads of the collar with said collar threads penetrating the circumference of the spacer when the joint is made up by threading the collar to the first and second tube ends.

3. The tube joint according to claim 2, wherein the radial sealing surface of each of the flanges is of a constant diameter and with a smooth continuous radial surface.

4. The tube joint according to claim 3, wherein the attachment of the flanges to their respective plastic liners is by fusing another radial sealing surface of the flange to a radial end surface of the liner.

5. The tube joint according to claim 2, wherein the attachment of the flanges to their respective plastic liners is by fusing another radial sealing surface of the flange to a radial end surface of the liner.

6. The tube joint according to claim 1, wherein the radial sealing surface of each of the flanges is of a constant diameter and with a smooth continuous radial surface.

7. The tube joint according to claim 6, wherein the attachment of the flanges to their respective plastic liners is by fusing another radial sealing surface of the flange to a radial end surface of the liner.

8. The tube joint according to claims 1, wherein the attachment of the flanges to their respective plastic liners is by fusing another radial sealing surface of the flange to a radial end surface of the liner.

9. A well tube joint comprising:
a first well tube having a first end with an externally threaded tapered portion adjacent the first end, said threaded portion having a minimum external diameter at the first tube first end as measured across the thread crests;
a first rigid, self-supporting plastic liner for insertion into the first well tube to extend through the first well tube;
a first flange formed of the same plastic material as the first plastic liner radially attached to an end of the first plastic liner and abutting the first end of the first well tube, the first flange defining a first radial sealing phase and a first unthreaded circumferential sealing surface having an external diameter corresponding to said minimum external diameter of the threaded portion of the first tube first end;
a second well tube having a second tube with an externally threaded tapered portion adjacent the second end, said threaded portion having a minimum external diameter at the tube second end as measured across the thread crests;
a second rigid, self-supporting plastic liner for insertion into the second well tube to extend through the second well tube;
a second flange formed of the same plastic material as the second plastic liner radially attached to an end of the second plastic liner and abutting the second end of the second well tube, the second flange defining a second radial sealing surface and a second unthreaded circumferential sealing surface having an external diameter corresponding to said minimum external diameter of the threaded portion of the second tube second end;
the ends of said plastic liners defining additional radially sealing surfaces;
a collar having internal threads engaging the threaded portions of the first and second well tubes, said collar internal threads comprising inwardly tapered threads having a minimum internal diameter as measured across the thread crest inside the collar in the central area of the collar;
said first and second tube ends, collar and flanges being dimensioned such that upon making up the well tube joint by threading the collar to the first and second tube ends, said flanges and said ends of said liners sealingly abut each other at their radial sealing surfaces and said circumferential sealing surfaces sealingly engage the internal threads of the collar with said collar threads penetrating the outer circumference of the flanges; and
wherein there is provided a smooth constant internal diameter floor path throughout the tubes due to the liners and flanges constant internal diameter.

10. The tube joint according to claim 9, including a plastic annular spacer formed from the same plastic material as the first and second flanges, said annular spacer defining third and fourth radial sealing surfaces at its opposed ends and a third circumferential sealing surface about its circumference, said circumferential sealing surface having an external diameter corresponding to the diameters of the first and second flanges, said spacer located between the first and second flanges; said spacer being dimensioned such that the first and third radial sealing surfaces are in sealing contact, and the second and fourth sealing surfaces are in sealing contact, and the third circumferential sealing surface sealingly engages the interior threads of the collar with said collar threads penetrating the circumference of the spacer when the joint is made up by threading the collar to the first and second tube ends.

* * * * *